United States Patent
Katayama

(10) Patent No.: US 6,911,272 B2
(45) Date of Patent: Jun. 28, 2005

(54) MAGNETIC RECORDING MEDIUM

(75) Inventor: Kazutoshi Katayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 120 days.

(21) Appl. No.: 10/402,964

(22) Filed: Apr. 1, 2003

(65) Prior Publication Data

US 2003/0186083 A1 Oct. 2, 2003

(30) Foreign Application Priority Data

Apr. 2, 2002 (JP) .................................. P.2002-100155

(51) Int. Cl.$^7$ ................................................ G11B 5/70
(52) U.S. Cl. ........................ 428/694 TS; 428/684 BS; 427/127
(58) Field of Search .................. 428/65.3, 65.5, 428/220, 560, 579, 611, 900, 694 R, 694 T, 694 TS, 694 BF, 694 BS, 694 SL, 447; 427/127, 129, 130, 226, 227; 524/731, 860, 863

(56) References Cited

U.S. PATENT DOCUMENTS

| | | | | |
|---|---|---|---|---|
| 4,429,024 A | * | 1/1984 | Ueno et al. ............. | 428/694 SL |
| 4,585,849 A | * | 4/1986 | Saykowski et al. ......... | 524/860 |
| 5,180,616 A | * | 1/1993 | Fukke et al. .............. | 428/65.3 |
| 6,042,939 A | * | 3/2000 | Takahashi .............. | 428/694 TS |
| 6,251,990 B1 | * | 6/2001 | Meguriya et al. ........... | 524/731 |
| 6,740,407 B1 | * | 5/2004 | Usuki et al. ............ | 428/694 TF |
| 2002/0028354 A1 | * | 3/2002 | Usuki .................... | 428/694 SL |
| 2002/0132908 A1 | * | 9/2002 | Yagihashi et al. .......... | 427/226 |
| 2004/0253462 A1 | * | 12/2004 | Narita et al. ................ | 428/447 |

FOREIGN PATENT DOCUMENTS

| | | | |
|---|---|---|---|
| JP | 63-023224 | * | 1/1988 |
| JP | 6-208717 | | 7/1994 |
| JP | 6-349042 | | 12/1994 |
| JP | 7-225934 | | 8/1995 |
| JP | 8-329443 | | 12/1996 |

OTHER PUBLICATIONS

Translation 08–329443.*
Translation JP 06–349042.*
Translation JP 06–208717.*
Translation JP 07–225934.*

* cited by examiner

*Primary Examiner*—Stevan A. Resan
*Assistant Examiner*—Louis Falasco
(74) *Attorney, Agent, or Firm*—Sughrue Mion, PLLC

(57) ABSTRACT

A magnetic recording medium comprising: a support; an undercoating layer; and a thin ferromagnetic metal layer, in this order, wherein the undercoating layer comprises a reaction product of a mixture comprising a compound represented by the following formula (I):

$$R_a\text{—Si—}X_b$$

wherein R represents an organic group having 1 to 40 carbon atoms which may contain a functional group; X represents a hydrolyzable group; a is an integer of 0 to 3; and a+b is 4, and an oligomer of a compound represented by the formula (I) which comprises at least two siloxane bonds and has a viscosity of 4 to 100 mPa·sec, the mixture comprising at least a compound represented by the formula (I) wherein b is 2 or greater.

10 Claims, No Drawings

MAGNETIC RECORDING MEDIUM

FIELD OF THE INVENTION

This invention relates to a magnetic recording medium having a thin ferromagnetic metal film as a magnetic layer.

BACKGROUND OF THE INVENTION

Magnetic recording media, such as magnetic tapes, floppy disks, and hard disks, are generally produced by forming a magnetic layer, a protective layer, etc. on a non-magnetic support. Metal-deposited magnetic recording media having a ferromagnetic metal film formed by vacuum thin film formation techniques, such as sputtering and vacuum evaporation, have been put to practical use. Such metal-deposited media easily reach high magnetic energy and easily achieve a smooth surface profile by using a non-magnetic support with a smooth surface, which leads to reduced spacing loss. As a result, they exhibit excellent electromagnetic performance and are suited to high-density recording. In particular, sputtering processing is capable of achieving higher magnetic energy than vacuum evaporation processing and has been adopted in the production of recording media demanding high recording density, such as hard disks.

The manufacturers have been challenged to develop magnetic recording media capable of higher density recording, and the demand for higher electromagnetic conversion characteristics has been boosted. To meet the demand for improved recording density, it is desirable that the magnetic layer of flexible magnetic recording media having a flexible polymer film (e.g., a polyethylene terephthalate film or a polyethylene naphthalate film) as a non-magnetic support, such as magnetic tapes and floppy disks, be a thin ferromagnetic metal film formed by sputtering or vacuum evaporation.

However, thin film formation on a polymer film by sputtering or vacuum evaporation at an increased evaporation rate involves problems on account of poor heat resistance of the polymer film. For example, the non-magnetic support (i.e., a polymer film itself or a layer thereon) is thermally deformed, or the surface of the support deteriorates due to precipitation of oligomers. As a result, the surface smoothness of the support is ruined, which will lead to a failure to form a smooth magnetic layer thereon.

The following approaches have been suggested to address the problems. One is to use a heat-resistant resin as a support. Polyimide films can be expected as a heat-resistant material. This approach is impractical however because, for one thing, polyimide films are generally expensive and, for another, polyimide films having satisfactory surface properties, i.e., high smoothness, are technically difficult to make and to use.

The other approach is to provide a relatively inexpensive polymer film, which has usually been used as a flexible support in conventional particulate magnetic recording media, with an undercoating layer to improve smoothness and heat resistance of the polymer film.

For instance, JP-A-6-349042 discloses a method of fabricating a film with satisfactory surface properties by providing a resin film containing fine particles on a polymer film having a relatively rough surface. However, where an ordinary resin binder as recited in the disclosed method is used, the film undergoes serious thermal damage to its surface when a magnetic layer is formed thereon by sputtering.

JP-A-7-225934 teaches a method for suppressing thermally induced oligomer precipitation by coating a polyethylene terephthalate film with polyethylene naphthalate. Notwithstanding the use of polyethylene naphthalate, the film undergoes deterioration due to oligomer precipitation when heated to 200° C., a temperature generally adopted in sputtering.

JP-A-6-208717 proposes coating a polymer film with a more heat-resistant polyamide or polyimide resin. Application of such a heat-resistant material endows a polymer film with a heat resistance feature withstanding sputtering but involves various problems. That is, because polyamide resins and polyimide resins generally have low solubility in general-purpose solvents, they need a hard-to-handle solvent. Even where they are soluble in a general-purpose solvent, the resulting resin solutions are too viscous to afford a uniform thin coating film and meet difficulty in increasing surface properties. It is difficult to thoroughly dry the solvent, resulting in a considerable residual solvent content in the coating film, which can cause blocking between the coating film and the reverse side of the film when the film is wound. The residual solvent can also evaporate and contaminate a vacuum chamber in magnetic layer formation.

It is effective to form a film of an inorganic substance as a still more heat-resistant coat. For example, a silica coat obtained by hydrolysis of a silane compound or a metal oxide coat obtained from a metal alkoxide can be expected as a heat-resistant inorganic film. However, such an inorganic film is incapable of following the thermal expansion of a non-magnetic support and develops cracks easily. A magnetic layer formed thereon will easily develop cracks, too.

The present inventors previously proposed in JP-A-8-329443 a magnetic recording medium having an undercoating layer mainly comprising Si—O or Si—O—N, which they believe has settled the above-mentioned problems to some extent. The support used in this magnetic recording medium has a smooth surface, suffers from no deterioration nor cracks when heated in sputtering for magnetic layer formation, and does not cause blocking. A problem associated with this undercoating layer is that the undercoating composition can crawl to cause craters when applied to a polymer film support, resulting in a failure to form a uniform coat. Besides, the coating composition is incapable of repeated application to obtain a desired thickness.

To overcome this problem, the present inventors have proposed a heat-resistant undercoating layer which mainly comprises a polymer of a silane coupling agent containing an organic group having an aromatic hydrocarbon moiety. It has turned out, however, that the undercoating layer suffers knots (sesame-like projections) assumably because of non-uniform rate of undercoating layer formation. This coating defect leads to a surface defect of the magnetic layer provided thereon.

SUMMARY OF THE INVENTION

An object of the present invention is to provide a magnetic recording medium with reduced surface defects on its undercoating layer and thereby involving reduced surface defects on the magnetic layer thereof.

The present invention relates to a magnetic recording medium comprising a support, an undercoating layer provided on at least one side of the support, and a thin ferromagnetic metal layer provided on the undercoating layer, wherein the undercoating layer contains a reaction product of a mixture comprising at least one compound represented by formula (I):

$$R_a—Si—X_b \quad (I)$$

wherein R represents an organic group having 1 to 40 carbon atoms which may contain a functional group; X represents a hydrolyzable group; a is an integer of 0 to 3; and a+b is 4, and an oligomer of a compound represented by formula (I) which contains at least two siloxane bonds and has a viscosity of 4 to 100 mPa·sec, the mixture containing at least a compound represented by formula (I) wherein b is 2 or greater.

The present invention provides preferred embodiments of the magnetic recording medium, in which:
(1) The compound represented by formula (I) comprises at least one of a silane coupling agent having an aromatic hydrocarbon group and a silane coupling agent having an epoxy group.
(2) The thin ferromagnetic metal layer is a film formed by sputtering.
(3) The magnetic recording medium is a disk.
(4) The undercoating layer is formed by coating the support with a coating composition comprising the compound represented by formula (I) and the oligomer of a compound represented by formula (I) which contains at least two siloxane bonds and has a viscosity of 4 to 100 mPa·sec and heating the coating layer.
(5) The coating composition contains a curing agent.
(6) The curing agent comprises a metal chelate compound.

DETAILED DESCRIPTION OF THE INVENTION

The undercoating layer of the invention, which will be sometimes referred to as a polymer film, comprises a polymerization reaction product of a compound represented by formula (I) (hereinafter referred to as a compound (I)) and an oligomer of a compound (I). The polymer film has reduced surface defects, which lead to reduced surface defects on the magnetic layer, and promises satisfactory stable electromagnetic performance. Comprising siloxane bonds containing an organic group, the polymer film is superior to conventional polyester resin films and the like in heat resistance and anti-block properties. The polymer film is excellent in crack resistance compared with a silica film prepared by a sol-gel process starting with tetraethoxysilane, etc.

The organic group of the undercoating layer contributes in not only flexibility to improve crack resistance but achieving a moderate surface energy, which will reduce the crawling phenomenon in applying and drying the coating composition. These contributory effects are pronounced where the support involves such surface defects as foreign matter attachment. The undercoating composition can be repeatedly applied without crawling until a desired undercoating layer thickness is reached.

Since the undercoating composition used in the invention is a solution of a monomer and an oligomer of a silicone resin, it has a low viscosity to provide a polymer film having excellent surface smoothness at the scales of the order of nanometer or sub-nanometer. Therefore, the support of the invention is very fit for future high recording density magnetic recording media.

As an additional feature, the magnetic recording medium of the invention does not undergo blocking caused by migration of undercoating layer components when rolled or stacked up.

In formula (I), R represents an organic group having 1 to 40 carbon atoms which may contain a functional group; X represents a hydrolyzable group; a is an integer of 0 to 3, preferably 1; and a+b is 4, provided that the mixture contains at least a compound (I) wherein b is 2 or greater.

The organic group R includes an aliphatic group and an aromatic group. The aliphatic group includes an alkyl group, an alkenyl group, an alkynyl group, and an aralkyl group, with an alkyl group being preferred. The organic group preferably contains 1 to 40 carbon atoms, particularly 1 to 35 carbon atoms. The alkyl group may be cyclic, straight, or branched or a combination thereof. The aromatic group is preferably a phenyl group. Preferred of these organic groups are a methyl group and a phenyl group.

The hydrogen atom of the organic group may be substituted with a functional group. The term "functional group" as used herein denotes a polymerizable group or a group capable of interacting with at least the support, for example, exerting an electrostatic interacting effect or a hydrogen bonding effect on the support. It is desirable for the compound (I) to contain such a functional group. The functional group may be a polymerizable group or a group capable of polymerizing to become a new functional group. The functional group may be one which exhibits polymerizability only in the presence of a curing agent (catalyst), such as a polymerization initiator.

The functional group includes a carbon-carbon double bond and one composed of a nitrogen atom, an oxygen atom, a sulfur atom, a phosphorus atom, etc.

Preferred examples of the functional group are a mercapto group, an amino group, and those containing at least a carbonyl group, a CONH linkage, a vinyl group, an epoxy group, and the like, such as $R_1R^2=CR^1—$, $R^1R^2=CR^1—CO—$, $R^1R^2N—$, $R^1S—$, $R^1CO—$, $R^1OOC—$, $R^1CON(R^2)—$, $R^1R^2N—CO—$, $R^1R^2N—COO—$, $R^1OCON(R^2)—$,

$MO_3S—$, $MO_3SO—$, $(MO)_2OP—$, and $(MO)_2OPO—$; wherein $R^1$ and $R^2$, which may be the same or different, each represent a hydrogen atom or has the same meaning as the organic group R, preferably a hydrogen atom or the organic group recited above as a preferred organic group R; and M represents a hydrogen atom, an alkali metal or an ammonium group.

Preferred of these functional groups are a glycidoxy group, an acryloxy group, and a methacryloxy group.

The organic group R may have one or more than one hydrogen atoms substituted with one or more than one functional groups which may be the same or different.

The hydrolyzable group as represented by X is a hydroxyl group or a group capable of becoming a hydroxyl group on reacting with water. The hydrolyzable group includes a halogen atom, a hydroxyl group, and an alkoxy group, with an alkoxy group being preferred. A methoxy group or an ethoxy group is particularly preferred.

The oligomer of the compound (I) which can be used in the invention contains at least two siloxane bonds and has a viscosity of 4 to 100 mPa·sec, preferably 4.5 to 80 mPa·sec, still preferably 5 to 50 mPa·sec.

The oligomer may have a one-dimensional configuration (linear or chain-like), a two-dimensional configuration (planar) or a three-dimensional configuration. In other words, the oligomer may have up to 4 siloxane bonds per a single silicon atom.

The molecules of the oligomer may be the same or different in structure of the repeating unit.

The undercoating layer which can be used in the present invention comprises a reaction product of a mixture containing the compound (I) and the oligomer thereof. The compound (I) to oligomer mixing ratio is selected appropriately. The oligomer is preferably used in an amount of 0.01 to 100 parts by weight, particularly 0.02 to 80 parts by weight, per 100 parts by weight of the compound (I).

The compound (I) preferably comprises a silane coupling agent having an aromatic hydrocarbon group and/or a silane coupling agent having an epoxy group. The silane coupling agent having an aromatic hydrocarbon group includes a compound (Ia) represented by formula (Ia):

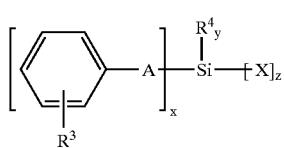

wherein X is as defined above; $R^3$ and $R^4$ each represent a monovalent organic group, such as methyl; A represents a single bond or a divalent organic group, such as an alkylene group; and x, y, and z are integers totaling 4.

In formula (Ia), A is preferably a single bond or a methylene group. X is preferably an alkoxy group taking into consideration reactivity and anticorrosion on the magnetic layer. An alkoxy group containing 4 or fewer carbon atoms, such as a methoxy group, is still preferred for facilitating polymerization reaction. x is preferably 1 or 2. For facilitating polymerization, x is still preferably 1. y is preferably 0 or 1. For facilitating polymerization, y is still preferably 0. Accordingly, z is particularly preferably 3.

Examples of the compound (Ia) are:

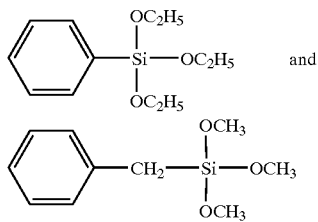

The silane coupling agent having an epoxy group includes a compound (Ib) represented by formula (Ib):

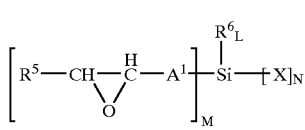

wherein X is as defined above; $A^1$ represents a divalent organic group (e.g., alkylene); $R^5$ represents a hydrogen atom or a monovalent organic group (e.g., alkyl); $R^6$ represents a monovalent organic group (e.g., alkyl); and L, M, and N are integers totaling 4.

In formula (Ib), $R^5$ is preferably a hydrogen atom. $R^6$ is preferably a monovalent organic group, such as methyl or ethyl. X is preferably an alkoxy group taking into consideration reactivity and anticorrosion on the magnetic layer. An alkoxy group containing 4 or fewer carbon atoms, e.g., methoxy, is still preferred for facilitating polymerization. $A^1$ is preferably an alkylene group having 1 to 5 carbon atoms and containing an ether linkage. M is preferably 1 or 2. For facilitating polymerization, M is still preferably 1. L is preferably 0 or 1. For facilitating polymerization, L is still preferably 0. Accordingly, N is particularly preferably 3.

The compound (Ib) includes

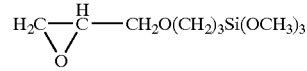

These compounds are described in JP-A-51-11871 and JP-A-63-23224.

The mixture of the compound (I) and the oligomer of the compound (I) is applied on the support and dried, whereupon the hydrolyzable groups of these compounds undergo hydrolysis and polymerize to form siloxane bonds. The epoxy group, on the other hand, undergoes ring opening and polymerizes in the presence of an acid catalyst or upon heat application. If desired, the hydrolysis rate and the polymerization rate can be controlled by addition of an acid, such as hydrochloric acid.

In order to lower the polymerization initiation temperature, it is recommended to use a curing agent in combination. Known curing agents, such as metal chelate compounds, organic acids and their salts, and perchlorates, are applicable, but metal chelate compounds are preferred in view of lowered curing temperature and reduced corrosion on the magnetic layer. For instance, where tris (acetylacetonato)aluminum is combined with 3-glycidoxypropyltrimethoxysilane, the mixture cures simply by heating at around 100° C. for a short time. That is, the curing reaction can be accomplished even on a polymer support having low heat resistance, such as a polyethylene terephthalate film. This means that the coating composition can be applied by continuous gravure coating followed by polymerization curing to provide a polymer-coated support that can be wound up without causing blocking. Particularly effective metal chelate compounds are those formed between a metal and a β-diketone, such as tris (acetylacetonato)aluminum, tetrakis(acetylacetonato) zirconium(IV), tris(acetylacetonato)titanium(III).

For heat resistance improvement, cost reduction, and polymerization rate control, a silane coupling agent containing such a hydrocarbon group as a methyl group can be used in combination. A combined use of such a silane coupling agent brings about improvement on heat resistance of the undercoating layer. The hydrocarbon group-containing silane coupling agent is represented by formula:

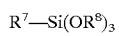

wherein $R^7$ and $R^8$ each represent a hydrocarbon group. The fewer the carbon atom number of $R^7$, the more effective for heat resistance improvement.

The undercoating layer is formed by applying the coating composition containing the compound (I) and the oligomer of the compound (I) to the support. Preferably, a solution of the compound (I) and the oligomer, a curing agent, and hydrochloric acid in an organic solvent, such as methanol, is applied to the support by wire bar coating, gravure coating, spray coating, dip coating, spin coating or like coating methods and dried. After drying, the undercoating layer may be baked, if necessary, to accelerate curing thereby to improve heat resistance, solvent resistance and adhesion.

The solvent used to prepare the coating composition depends on the amount of hydrochloric acid and the structure of the silane coupling agent. Useful solvents include alcohols, such as ethanol, methanol, and isopropyl alcohol, and cyclohexanone,.

While the drying is for evaporating the solvent, it is possible to make the coating composition cure on drying. The drying is carried out in a commonly employed method, such as hot air drying or infrared drying. A recommended drying temperature is about 60 to 150° C.

The post-drying baking for cure acceleration can be performed by hot air heating, infrared heating, hot roller heating, and like methods. While dependent on the coating layer thickness, the method of subsequent magnetic layer formation, and the magnetic layer forming temperature, advisable heating temperatures range from 100 to 250° C., preferably 120 to 200° C., for a coating film thickness of about 1 µm. At lower temperatures, the progress of polymerization is insufficient. Higher heating temperatures can deform the support or lead to reduction of productivity.

In place of thermal polymerization, ultraviolet- or electron beam-induced polymerization is possible.

The undercoating layer may contain additives in addition to the above-described components. Useful additives include heat-resistant fine particles (fillers) for providing the undercoating layer with microfine projections, metal alkoxides for adjusting heat resistance and hardness of the coating layer, coupling agents for improving adhesion to the support, and rust inhibitors for protecting the magnetic layer from oxidation.

The heat-resistant fine particles for making microfine projections include those of inorganic oxides, such as silica, alumina, titania, and zirconia, calcium carbonate, carbon, and polymers. It is desirable that the particles be monodispersed and spherical. The particle size is selected from a range of from 5 to 1000 nm, preferably 10 to 100 nm, according to the thickness of the undercoating layer. Since the undercoating composition is a solution in a solvent mainly comprising an alcohol, cyclohexanone, methyl ethyl ketone, toluene, etc., the heat-resistant fine particles are preferably an organosilica sol dispersed in one or more of these solvents or silica sol dispersed in an acidic aqueous solution.

The metal alkoxides added for adjusting the heat resistance and hardness of the undercoating layer include tetraethoxysilane and zirconium tetrapropoxide. Addition of such an additive brings about improvement on heat resistance and hardness.

The support which can be used in the invention may be either flexible or rigid. Flexible supports include films of polyethylene terephthalate, polyethylene naphthalate, polyimide, polyamide or polyamideimide having a thickness of 3 to 100 µm. Plastic films containing a filler to make surface unevenness are also usable. Rigid supports include a glass plate, an aluminum plate, and a carbon plate.

The undercoating layer of the invention exhibits excellent adhesion to the support. Where adhesion is insufficient, the support may be subjected to surface treatment with a silane coupling agent, etc. or a surface treatment such as an oxygen plasma treatment, an argon plasma treatment, ultraviolet irradiation, electron beam irradiation or a flame treatment.

The thin ferromagnetic metal film as a magnetic layer can be formed by known vacuum evaporation or sputtering processing.

Where the magnetic layer is formed by sputtering, the target includes known metals or alloys mainly comprising cobalt, such as Co—Cr, Co—Ni—Cr, Co—Cr—Ta, Co—Cr—Pt, Co—Cr—Ta—Pt, Co—Cr—Pt—Si, and Co—Cr—Pt—B. Co—Cr—Ta or Co—Cr—Pt is preferred for obtaining improved electromagnetic characteristics. An advisable magnetic layer thickness is 10 to 300 nm. It is desirable to provide an underlayer between the undercoating layer and the magnetic layer for improving electromagnetic characteristics of the magnetic layer. The underlayer can be of known metals or alloys, such as Cr, V, Ti, Ta, W, Si, and their alloys, with Cr, Cr—Ti, Cr—V, and Cr—Si being preferred. The thickness of the underlayer usually ranges 5 to 500 nm, preferably 10 to 200 nm.

In sputtering, the support is preferably heated to about 150 to 200° C.

Where the magnetic layer is formed by vacuum evaporation, the evaporation source includes cobalt or known alloys mainly comprising cobalt, such as Co—Ni, and Co—Fe. The evaporation source may be evaporated in an oxygen-containing atmosphere to form an oxygen-containing magnetic layer. The magnetic layer is preferably made of oxygen-containing cobalt (Co—O) or (Co—O)-containing cobalt alloys (e.g., Co—Fe) having a cobalt content of 90% or higher, particularly 95% or higher, based on the total metal for obtaining improved electromagnetic characteristics. The thickness of the magnetic layer is desirably 100 to 300 nm, more desirably 120 to 200 nm.

In order to improve the electromagnetic characteristics, the thin ferromagnetic metal film may have a multilayer structure or may have a non-magnetic underlayer or an intermediate layer.

If desired, a protective layer can be provided on the thin ferromagnetic metal layer to further improve running durability and anticorrosion. Materials for forming the protective layer include oxides, such as silica, alumina, titania, zirconia, cobalt oxide, and nickel oxide; nitrides, such as titanium nitride, silicon nitride, and boron nitride; carbides, such as silicon carbide, chromium carbide, and boron carbide; and carbonaceous materials, such as graphite and amorphous carbon.

The carbonaceous protective layer is a carbon film made of amorphous carbon, graphite, a diamond structure or a mixture thereof by plasma-enhanced CVD, sputtering or a like technique. A film of hard carbon called diamond-like carbon (DLC) having a Vickers hardness of 1000 kg/mm$^2$ (9.8 GPa) or higher, preferably 2000 kg/mm$^2$ (19.6 GPa) or higher, is particularly preferred. DLC has an amorphous structure and electrically non-conductive. The structure of a DLC film is confirmed by a peak appearing between 1520 and 1560 cm$^{-1}$ in Raman spectroscopy. As the carbon film structure deviates from the diamond-like structure, the peak detected in Raman spectroscopy deviates from the above range, and the hardness of the carbon film decreases.

The DLC film can be formed by plasma-enhanced CVD using a carbon-containing evaporation source, such as alkanes (e.g., methane, ethane, propane, and butane), alkenes (e.g., ethylene and propylene) or alkynes (e.g., acetylene), or sputtering using a carbon target in a hydrogen or hydrocarbon atmosphere. The DLC film preferably has a thickness of 2.5 to 20 nm, particularly 5 to 10 nm. Too thick a DLC protective film can cause deterioration of electromagnetic characteristics or adhesion to the magnetic layer. Too thin a DLC film has insufficient wear resistance.

The surface of the DLC film may be treated with an oxidative gas or an inert gas to improve adhesion to a lubricant hereinafter described.

It is preferred to apply a lubricant or a rust inhibitor to the protective layer for improving running durability and anti-corrosion. Useful lubricants include known ones, such as hydrocarbon lubricants, fluorine lubricants, and extreme pressure additives.

The hydrocarbon lubricants include carboxylic acids, such as stearic acid and oleic acid; esters, such as butyl stearate, sulfonic acids, such as octadecylsulfonic acid, phosphoric esters, such as monooctadecyl phosphate; alcohols, such as stearyl alcohol and oleyl alcohol; carboxylic acid amides, such as stearamide; and amines, such as stearylamine.

The fluorine lubricants include the above-recited hydrocarbons with part or the whole of their alkyl moiety being displaced with a fluoroalkyl group or a perfluoropolyether group. The perfluoropolyether group includes those derived from perfluoromethylene oxide polymers, perfluoroethylene oxide polymers, perfluoro-n-propylene oxide polymers $(CF_2CF_2CF_2O)_n$, perfluoroisopropylene oxide polymers $(CF(CF_3)CF_2O)_n$, and copolymers of these monomer units.

The extreme pressure additives include phosphoric esters, such as trilauryl phosphate; phosphorous esters, such as trilauryl phosphite; thiophosphorous esters, such as trilauryl trithiophosphite; thiophosphoric esters; and sulfur type ones, such as dibenzyl disulfide.

These lubricants can be used either individually or as a combination of two or more thereof. The lubricant is applied by coating the protective layer with a solution of a desired lubricant in an organic solvent by wire bar coating, gravure coating, spin coating, dip coating or a like coating method, or by depositing a lubricant by vacuum evaporation. The amount of the lubricant to be applied is preferably 1 to 30 $mg/m^2$, still preferably 2 to 20 $mg/m^2$.

The rust inhibitors include nitrogen-containing heterocyclic compounds, such as benzotriazole, benzimidazole, purine, and pyrimidine, and derivatives thereof having an alkyl side chain, etc. introduced into their nucleus; and nitrogen- and sulfur-containing heterocyclic compounds, such as benzothiazole, 2-mercaptobenzothiazole, tetraazaindene compounds, and thiouracil compounds, and their derivatives.

EXAMPLES

The present invention will now be illustrated in greater detail with reference to Examples, but it should be understood that the invention is not deemed to be limited thereto.

Example 1

In ethanol were dissolved phenyltriethoxysilane (KBE-103, available from Shin-Etsu Chemical Co., Ltd.) and γ-glycidoxypropyltrimethoxysilane (KBM-403, from Shin-Etsu Chemical) at a KBE-103:KBM-403 weight ratio of 1:1, 60 wt % of an oligomer (KR-217, from Shin-Etsu Chemical; viscosity: 8 mPa·sec) based on the total weight of KBE-103 and KBM-403, and hydrochloric acid to prepare an undercoating composition. Tris(acetylacetonato)aluminum was added thereto as a curing agent. The resulting undercoating composition was applied to a 20 μm thick Aramid film by gravure coating and dried at 100° C. to form a 1 μm thick undercoating layer. A pair of coated films thus prepared were laminated with each other via a 10 μm thick adhesive sheet with the undercoating layers outside. The resulting laminate film had a total thickness of 52 μm. The laminate film was heated at 170° C. for 2 hours to cure the undercoating layers and the adhesive and to remove the solvent. On the undercoating layer of the laminate were successively deposited a Cr—Ti underlayer to a thickness of 60 nm and a Co—Pt—Cr magnetic layer to a thickness of 30 nm by DC magnetron sputtering at a substrate temperature of 150° C. A carbon protective layer was deposited on the magnetic layer to a deposit thickness of 20 nm by DC magnetron sputtering. A solution of a perfluoropolyether lubricant (Fomblin Z-DOL, from Audimont) in a hydrofluoroether solvent (HFE-7200, from Sumitomo 3M) was applied to the protective layer by gravure coating to form a 2 nm thick lubricating layer. The underlayer, the magnetic layer, the protective layer, and the lubricating layer were formed on each undercoating layer. The resulting coated film was punched into 3.7" disks to obtain two-sided flexible magnetic recording disks.

Example 2

Flexible magnetic recording disks were prepared in the same manner as in Example 1, except that KR-217 (oligomer) was added in an amount of 90 wt % based on the total weight of KBE-103 and KBM-403 (organosilanes).

Example 3

Flexible magnetic recording disks were prepared in the same manner as in Example 1, except that KR-213 (oligomer from Shin-Etsu Chemical; viscosity: 18 mPa·sec) was added in place of KR-217 in an amount of 90 wt % based on the total weight of KBE-103 and KBM-403 (organosilanes).

Example 4

Flexible magnetic recording disks were prepared in the same manner as in Example 1, except that KR-510 (oligomer, from Shin-Etsu Chemical; viscosity: 100 mPa·sec) was added in an amount of 0.1 wt % based on the total weight of KBE-103 and KBM-403 (organosilanes).

Comparative Example 1

Flexible magnetic recording disks were prepared in the same manner as in Example 1, except that the undercoating layer was formed without using KR-217 (oligomer).

The samples prepared in Examples and Comparative Example were evaluated as follows. The results of evaluation are shown in Table 1 below.

The surface of the undercoating layer (before formation of the underlayer) and the surface of the sample were observed under an optical microscope (50 times magnification, 10 fields). The number of defects (circles of about 0.1 mm in diameter in the in-plane direction with the central portion projecting) was counted. A surface with 10 or fewer defects was rated A; 30 or fewer, B; 51 or more, C; and 101 or more, D.

TABLE 1

| | Number of Surface Defects | |
|---|---|---|
| | Undercoating Layer | Sample |
| Example 1 | A | A |
| Example 2 | A | B |
| Example 3 | A | A |
| Example 4 | B | B |
| Comparative Example 1 | C | D |

As described above, the undercoating layer formed on the support is a film of a polymer of the compound (I) comprising an aromatic hydrocarbon-containing silane coupling agent and/or an epoxy-containing silane coupling agent and an oligomer of the compound (I). Therefore, the undercoating layer contains siloxane bonds and/or bonds resulting from epoxy ring opening. The polymer film (undercoating layer) of the invention is superior to conventional polyester resin films in heat resistance and anti-blocking properties. The polymer film is also superior in crack resistance to a silica film formed by a sol-gel process starting with tetraethoxysilane, etc. Because of use of an oligomer, the undercoating composition is capable of reducing coating defects, resulting in reduction of surface defects of the magnetic layer formed on the undercoating layer, which leads to satisfactory stable electromagnetic characteristics.

This application is based on Japanese Patent application JP 2002-100155, filed Apr. 2, 2002, the entire content of which is hereby incorporated by reference, the same as if set forth at length.

What is claimed is:

1. A magnetic recording medium comprising:

a support;

an undercoating layer; and a ferromagnetic metal layer, in this order, wherein the undercoating layer comprises a reaction product of a mixture comprising a compound represented by the following formula (I):

wherein R represents an organic group having 1 to 40 carbon atoms which may contain a functional group; X represents a hydrolyzable group; a is an integer of 0 to 3; and a+b is 4, and an oligomer of a compound represented by the formula (I) which comprises at least two siloxane bonds and has a viscosity of 4 to 100 mPa·sec, the mixture comprising at least a compound represented by the formula (I) wherein b is 2 or greater.

2. The magnetic recording medium according to claim 1, wherein the compound represented by the formula (I) comprises at least one of a silane coupling agent having an aromatic hydrocarbon group and a silane coupling agent having an epoxy group.

3. The magnetic recording medium according to claim 1, wherein the ferromagnetic metal layer is a film formed by sputtering.

4. The magnetic recording medium according to claim 1, which is a disk.

5. The magnetic recording medium according to claim 1, wherein the undercoating layer is formed by coating the support with a coating composition comprising the compound represented by the formula (I) and the oligomer of a compound represented by the formula (I) and heating the coating layer.

6. The magnetic recording medium according to claim 5, wherein the coating composition comprises a curing agent.

7. The magnetic recording medium according to claim 6, wherein the curing agent comprises a metal chelate compound.

8. The magnetic recording medium according to claim 1, wherein the ferromagnetic metal layer has a thickness of 100 to 300 nm.

9. The magnetic recording medium according to claim 1, wherein the hydrolyzable group is a halogen atom, a hydroxyl group, or an alkoxy group.

10. The magnetic recording medium according to claim 1, further comprising a protective layer provided on the ferromagnetic metal layer.

* * * * *